Oct. 14, 1958   R. T. BURNETT   2,856,032
BRAKE ACTUATOR

Filed May 10, 1954   2 Sheets-Sheet 1

INVENTOR.
RICHARD T. BURNETT
BY Cecil J Arens
ATTORNEY

Oct. 14, 1958　　　　　R. T. BURNETT　　　　　2,856,032
BRAKE ACTUATOR

Filed May 10, 1954　　　　　　　　　　　　　　2 Sheets-Sheet 2

INVENTOR.
RICHARD T. BURNETT
BY Cecil J. Akers

ATTORNEY

United States Patent Office 2,856,032
Patented Oct. 14, 1958

2,856,032

BRAKE ACTUATOR

Richard T. Burnett, South Bend, Ind., assignor to Bendix Aviation Corporation, South Bend, Ind., a corporation of Delaware Application May 10, 1954, Serial No. 428,742

8 Claims. (Cl. 188—70)

This invention concerns an actuating device for brakes, and more particularly an actuating device of the hydraulic type.

In the type of brake disclosed in my application Serial No. 369,197, filed July 20, 1953, it is desirable to retain a standard width brake notwithstanding the rearrangement of the brake actuator or fluid motor transversely of the brake between parallel sides of the rotatable member. With such an arrangement the overall length of the fluid motor cylinder is actually reduced with a consequent loss in piston guiding surface as the pistons are extended. Because the side loading on these pistons is large the loss of a portion of the cylinder as a guiding surface would be detrimental if additional bearing and guiding surfaces were not incorporated into the device of the invention in a manner to be hereinafter explained.

An important object of the invention is to provide a hydraulic actuator comprising a cylinder and interengaging oppositely acting pistons.

A further object of the invention is to provide a fluid motor with interengaging pistons which contribute to an overall reduction in the length of the motor without sacrificing piston stroke.

The above and other objects and features of the invention will be apparent from the following description of the brake actuator taken in connection with the accompanying drawings which form a part of this specification and in which.

Figure 1:
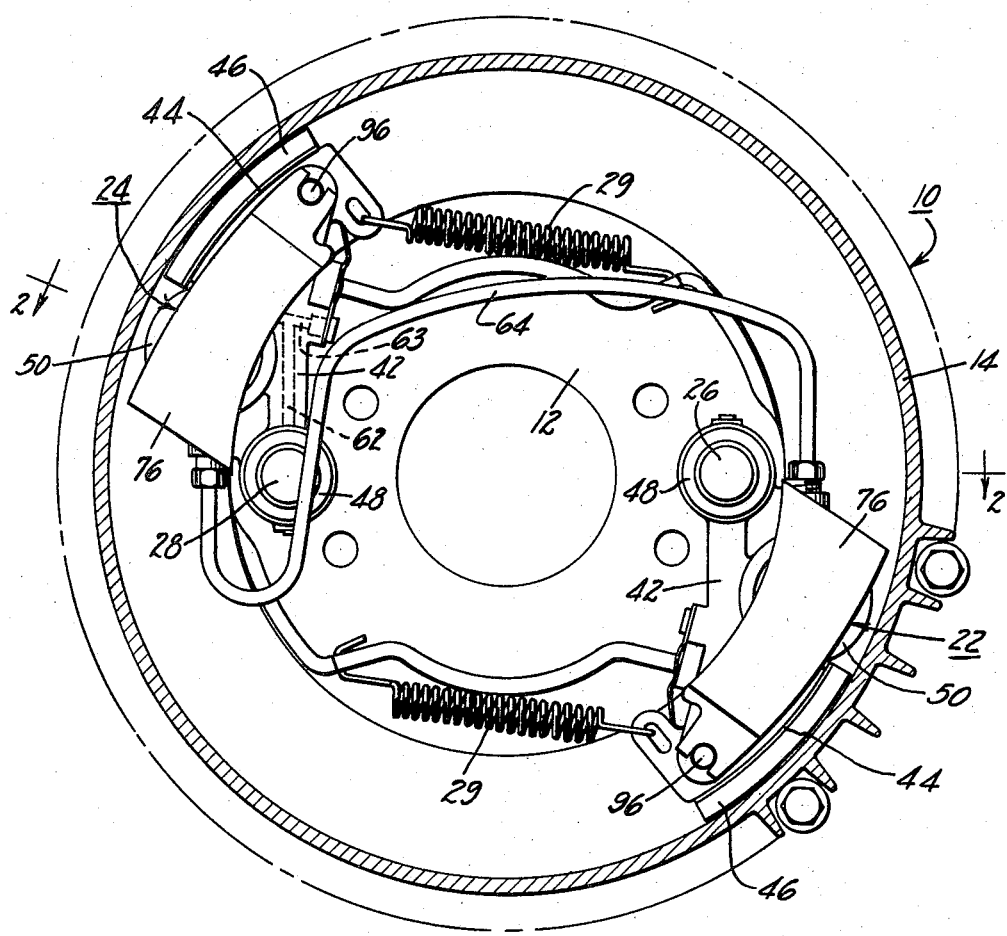
Figure 1 is a view in vertical section of a brake embodying the device of the invention.

Referring now to the drawings and specifically to Figure 1 thereof the reference numeral 10 designates a brake with which the device of the invention is associated. The brake comprises a fixed member or backing plate 12, a rotatable element 14 having spaced parallel sides 16 and 18 and a cylindrical portion 20 joining the sides together. Braking devices 22 and 24 are pivotally supported on anchors 26 and 28 respectively, which are suitably secured to the backing plate 12. Springs 29 interconnected between the backing plate and braking devices hold the latter out of engagement with the surface of the cylindrical portion 20.

The anchors 26 and 28 which are identical, only one of which will be described, perform the additional function of a hydraulic connection for the braking devices. With reference to anchor 26, it is provided with a longitudinal bore 30 and radial passages 32 intersecting the bore. The radial passages 32 terminate in an annular channel 34 formed in cylindrical surface 36 of the anchor 26. The end of the bore 30 opposite from its intersection with radial passages 32 is enlarged and threaded at 38 to be connected to a hydraulic line, not shown. Anchor 28 is equipped with a fitting 40 adapted to bleed the system.

The braking devices 22 and 24 are identical and each is constructed with an element 42 and shoe element 44. The shoe element is provided with lining material 46 secured thereto for frictional engagement with the surface of the cylindrical portion 20. Cylindrical members 48 and 50 are formed integral with the element 42. The cylindrical member 48 is rotatably carried on the cylindrical surface 36 of the anchors. Seals 52 are located on each side of the annular channel 34 and wipe the internal surface of the cylindrical member 48 which is rotatably held between a shoulder 54 of the anchor and a washer 56. A retaining ring 58 is carried in a groove 60 of the anchor to lock the washer 56 in position against one end of the cylindrical member 48. Passages 62 and 63, see Figure 1, communicate the annular channel 34 with the cylindrical member 50 provided with open ends 59 and 61. A conduit 64 connects the cylindrical members 50 of the two braking devices.

The brake actuator of fluid motor 65 of the invention comprises in addition to the cylinder 50 a pair of oppositely acting pistons 66 and 68 arranged at the ends of the cylinder and extendible therefrom. The adjacent or inner ends of the pistons, which are subjected to fluid under pressure, are chamfered to provide a chamber 70 when the pistons are retracted. This chamber communicates with the passage 63. Seals 71 arranged in grooves 73 of the cylinder 50 wipe the pistons 66 and 68, preventing leakage of fluid from chamber 70. Three radially located axially extending suitably spaced guide pins 72 are carried at the adjacent ends of each piston for sliding engagement with three axially extending bores or openings 74 in each of the other pistons. The guide pins 72 are closely fitted into the bores 74 in order to maintain the piston and cylinder axes co-extensive when the pistons are fully extended to their maximum stroke. Where the oppositely acting pistons are guided by interengaging elements of both pistons a reduction in the over-all length of the actuator cylinder 50 is achieved without sacrificing piston stroke. This arrangement is especially desirable where space is a limitation such, for example, where the fluid motor must be interposed between the two parallel rotatable sides 16 and 18. As the lining material 76 wears the pistons will eventually extend beyond the ends of the cylinder 50 a distance equal to the thickness of the lining, thus reducing the guiding surfaces between the cylinder and pistons. The pistons would then become misaligned or cocked in the cylinder were it not for the interengaging portions of the pistons distributing the guiding action over both pistons and the cylinder. That is, the turning or cocking force applied to piston 66, for example, would be opposed by the reaction force taken into the cylinder through both pistons 66 and 68 and not just piston 66. With this arrangement of the pistons the net effect is the same as if the pistons 66 and 68 were joined as one insofar as piston bearing or guiding surface is concerned. Each of the pistons 66 and 68, although independent in operation, has a portion of its guiding area supplied by the other piston.

The remote or outer ends of the pistons 66 and 68 are formed with sockets 75 and 77 respectively for the reception of spherical elements 78 and 80 integrally related to flat circular portions 82 and 84 which are mounted to plates 83 and 85 to which the wear pads or frictional material lining 76 is secured. The sockets 75 and 77 are provided with circumferential grooves 88 and 90 into which C-shaped spring elements 92 are inserted to thereby lock the spherical elements into their respective sockets. To prevent rotation of the wear pads 76 about the axes of the pistons the plates 83 and 85 are slotted at their ends for engagement with pins 96 mounted on the element 42 and extending perpendicularly thereto.

Figure 2:
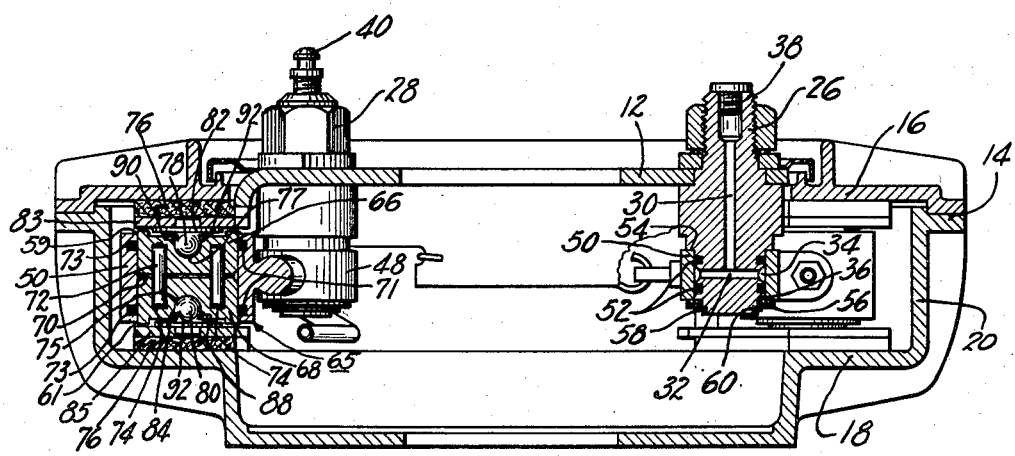
Figure 2 is a view in section taken on the line 2—2 of Figure 1.
Figure 3:
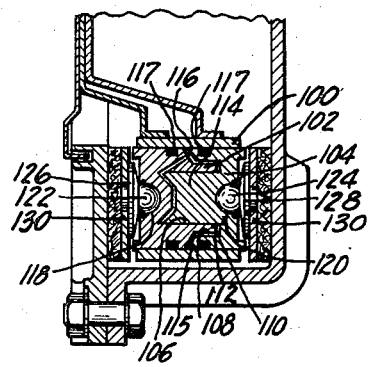
Figure 3 is a modified form of the device of the invention shown in longitudinal section.

Figure 3 represents a modified embodiment of a fluid motor comprising a cylinder 100 which may be suitably secured to the element 42 of Figure 2 in the same manner as cylindrical member 60. The cylinder 100 is open at its ends in order to receive two pistons 102 and 104 which are arranged therein for coaxial movement in opposite directions. The outer or remote ends of the pistons are extendible from the ends of the cylinder when the inner ends are subjected to fluid under pressure. Piston 102 is provided with a female portion or central bore 106. The inner end of the piston 102 is reduced at 108 to form an extension 110 having a diameter considerably less than the diameter of the piston. The inner end of piston 104 is formed with an annular groove 112 defining a male or central portion 114 and an outer concentric portion 115, the latter enveloping the reduced extension 110. The central portion 114 and the annular groove 112 of the piston 104 cooperate with the bore 106 and extension 110 respectively of the piston 102 to establish mutual guiding surfaces between the two pistons. The sliding fit between the bore 106 and central portion 114 must be such that upon movement of the pistons in opposite directions the mutually guiding surfaces between the pistons will hold them coaxially aligned within the cylinder 100 in spite of the loss in guiding surface between the pistons and cylinder as a result of extending the pistons beyond the ends of the cylinder. The adjacent ends of the pistons are formed to provide an annular chamber 116 which communicates with the passage 63, as best shown in Figure 2. Each piston is provided with an O-ring 117 preventing leakage from chamber 116 to atmosphere. The remote ends of the pistons 102 and 104 are formed with sockets 118 and 120 repectively to receive spherical elements 122 and 124 integrally associated with flat circular portions 126 and 128 to which wear pads 130 are secured.

Although this invention has been described in connection with certain specific embodiments, the principles are susceptible of numerous other applications that will readily occur to persons skilled in the art.

I claim:

1. In a kinetic-energy-absorbing device, a U-shaped cross section rotor, a hydraulic fluid motor comprising a cylinder fitted between the laterally spaced apart sides of the rotor with the longitudinal axis of the cylinder substantially perpendicular thereto, and a pair of oppositely acting pistons in the cylinder, said pistons having their adjacent ends equipped with interengaging portions, said interengaging portions being in rigid inflexible slidable engagement forming a solid cross-section between said pistons which serves as a guide means in the regions of their slidable engagement, said interengaging portions being thereby constructed to render the cylinder-bearing surfaces of both pistons effective for each piston, and a friction element removably supported on the remote ends of said pistons.

2. In combination with a U-shaped cross section rotor, an axially extending hydraulic fluid motor comprising a cylinder which is fitted between the parallel sides of the rotor and a pair of oppositely acting pistons slidably engaging the walls of said cylinder, said pistons having their adjacent ends equipped with axial extending interengaging portions, said interengaging portions being in rigid slidable engagement and forming a solid cross-section through the pistons and interengaging portions, said interengaging portions serving as guide means in the region of their slidable interengagement to maintain the pistons in coaxial relationship as the pistons are extended beyond the ends of said cylinders, both of said pistons being constructed and arranged to provide anchoring surfaces at their bearing surfaces within the cylinder bore of said cylinder.

3. A hydraulic fluid motor comprising a cylinder and a pair of pistons therein arranged end to end for coaxial movement in opposite directions with the remote ends of the pistons extending beyond the ends of the cylinder, said pistons having their adjacent ends equipped with interengaging portions which form a rigid inflexible guide between said pistons by providing mutual guiding surfaces for the pistons to thereby obtain an effective cylinder bearing for each piston which is equivalent to the combined bearing surfaces of both pistons, the cylinder bearing for each piston being a solid cross-section between said pistons and guide means where the pistons are so interengaged.

4. A hydraulic fluid motor for use with a brake comprising a cylinder open at its ends, and a pair of pistons in the cylinder, one at each end and extendible therefrom, the inner end of one of said pistons having an axially extending portion the diameter of which is less than the diameter of the piston, said axial extending portion having a central bore therein, the inner end of the other of said pistons having an annular groove therein defining an inner central portion which slidably engages the central bore and an outer portion which envelops the axially extending portion of said one piston, said axially extending portion forming a solid cross-section with the piston combined therewith and extending into the central bore of the other piston to form a guide of solid cross-section with respect to the other piston.

5. In a brake, a rotatable member having spaced apart parallel sides and a cylindrical portion joining said sides, a fixed member, a braking device pivotally carried on said fixed member and including a friction shoe element engageable with said cylindrical portion when pivoted, and a hydraulic fluid motor located between said sides, said fluid motor being provided with oppositely acting pistons extendible from the ends of the cylinder for engagement with said sides to thereby cause said device to pivot, said pistons having their inner ends provided with telescoping elements which furnish mutual bearing support for the pistons when they are extended thus utilizing the entire guiding surface of the cylinder and both pistons.

6. In a kinetic-energy-absorbing device, a pair of oppositely-acting axially-reciprocable friction members engageable with the spaced parallel sides of a rotor, a cylinder mounted between the spaced parallel sides of the rotor and substantially perpendicularly thereto, two oppositely-acting pistons slidably received in the cylinder bore of said cylinder and guided by the bearing surfaces between said cylinders and the walls of the cylinder bore, said friction members being laterally supported by said piston, projections which extend between said pistons to be slidably interfitted therewith so that the effective cylinder wall bearing provided for each piston is the summation of the bearing surfaces for both pistons, said projections forming, along with the pistons in which they are interfitted, a solid cross-section with respect to each piston to serve as a rigid inflexible guide in the regions of the slidable engagement between said projections and the openings of the piston into which they are extended, the bearing surfaces between said pistons and cylinder bore being constructed and arranged to provide anchoring surfaces for said friction elements.

7. In a kinetic-energy-absorbing device according to claim 6, a cylinder construction having open ends permitting extension of the pistons beyond the ends thereof to develop maximum biasing movement of the associated friction elements with the available cylinder length.

8. The kinetic-energy-absorbing device of claim 6, in which the friction members are supported solely by said pistons and anchor through said pistons against the cylinder walls by exerting force transversely to said cylinder.

References Cited in the file of this patent

UNITED STATES PATENTS

| | | |
|---|---|---|
| 1,660,481 | Down | Feb. 28, 1928 |
| 1,668,730 | Pearson | May 8, 1928 |
| 1,707,742 | Schjolin | Aug. 2, 1929 |
| 1,906,733 | Bendix | May 2, 1933 |
| 2,195,558 | Bowen | Apr. 2, 1940 |
| 2,333,682 | Schneider | Nov. 9, 1943 |
| 2,701,042 | Kurzweil | Feb. 1, 1955 |